(12) United States Patent
Grootherder et al.

(10) Patent No.: US 8,839,946 B2
(45) Date of Patent: Sep. 23, 2014

(54) APPARATUS FOR CONVEYING EGGS

(75) Inventors: Berend Derk Grootherder, Brummen (NL); Eddy Alfred Herre Van Der Goot, Harderwijk (NL); Barend Dinant Hardeman, Lunteren (NL)

(73) Assignee: FPS Food Processing Systems B.V., Amstelveen (NL)

( * ) Notice: Subject to any disclaimer, the term of this patent is extended or adjusted under 35 U.S.C. 154(b) by 4 days.

(21) Appl. No.: 13/640,963

(22) PCT Filed: Apr. 15, 2011

(86) PCT No.: PCT/NL2011/050258
§ 371 (c)(1),
(2), (4) Date: Nov. 21, 2012

(87) PCT Pub. No.: WO2011/136644
PCT Pub. Date: Nov. 3, 2011

(65) Prior Publication Data
US 2013/0056329 A1 Mar. 7, 2013

(30) Foreign Application Priority Data
Apr. 15, 2010 (EP) .................................. 10003982

(51) Int. Cl.
*B65G 43/08* (2006.01)
(52) U.S. Cl.
USPC ........... 198/444; 198/436; 198/437; 198/442; 198/445; 198/453; 198/454
(58) Field of Classification Search
USPC ......... 198/367.1, 370.02, 436, 437, 442, 444, 198/445, 579, 601, 453, 454, 457.05, 456, 198/461.1, 572, 577
See application file for complete search history.

(56) References Cited

U.S. PATENT DOCUMENTS

| 3,998,319 A | 12/1976 | Mernoe |
| 4,276,977 A | 7/1981 | Van Kattenbroek |

(Continued)

FOREIGN PATENT DOCUMENTS

| DE | 195 30 626 | 2/1997 |
| DE | 20 2005 01312 | 11/2005 |

(Continued)

OTHER PUBLICATIONS

International Search Report for PCT/NL2011/050258 dated Sep. 1, 2011.

(Continued)

*Primary Examiner* — Leslie A Nicholson, III
(74) *Attorney, Agent, or Firm* — Marvin Petry; Stites & Harbison PLLC

(57) ABSTRACT

The invention relates to a system and a method for, in a conveying direction T during conveyance, continuously distributing a flow or products, for instance eggs, comprising: —a distributing assembly with at least two feed channels extending in a conveying direction T for each forming a single row of products, wherein at least edge elements compose the edges of these channels over a well-defined distribution length and wherein these edge elements are provided above and adjacent a conveying surface at the downstream end of a feed conveyor, and —a control for monitoring and controlling the distribution of the products over the channels, wherein, based on monitoring signals and control signals, from the downstream end of the channels, only two products are transferred simultaneously to the conveyor, wherein the control, based on the monitoring signals and control signals, increases or reduces the speed of the conveyor according to a continuous adjustment.

19 Claims, 2 Drawing Sheets

(56) References Cited

U.S. PATENT DOCUMENTS

Figure 1:
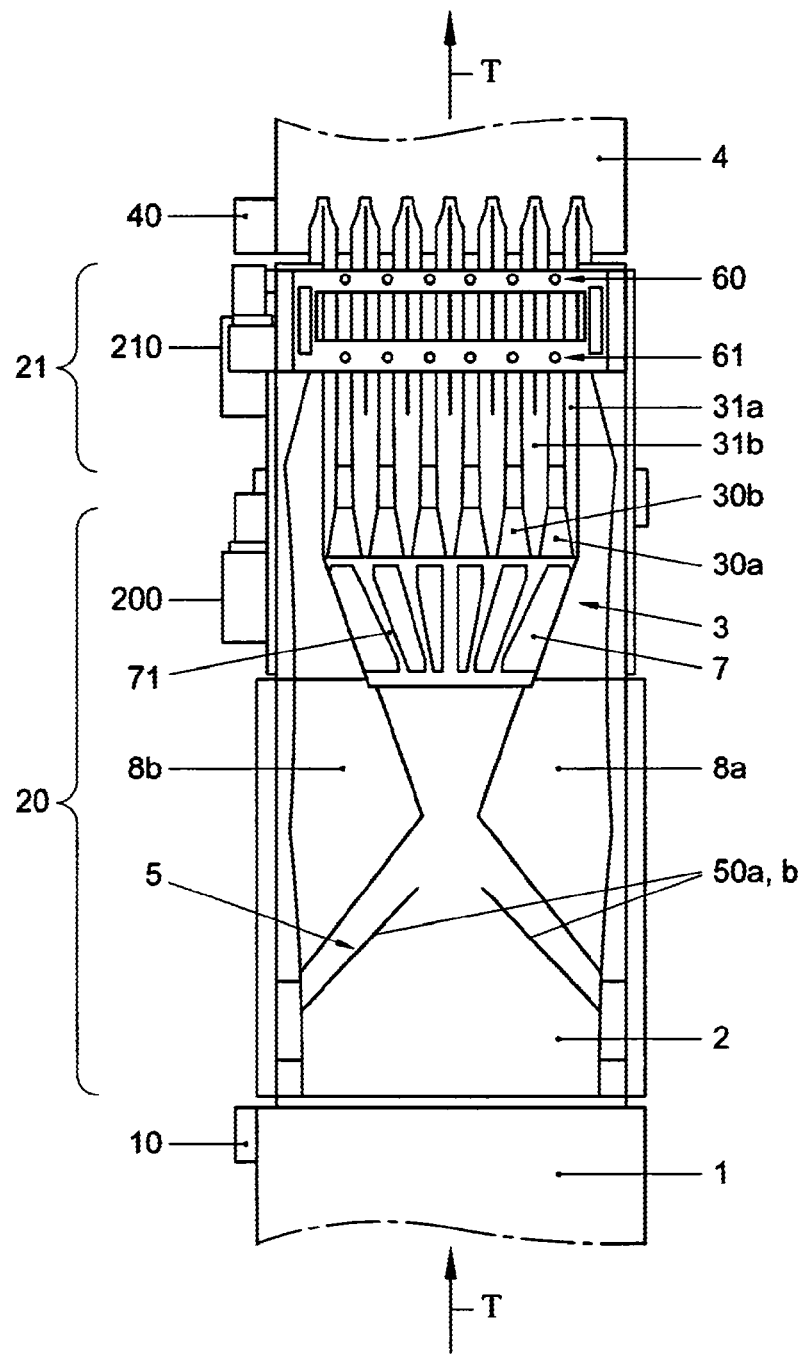

| | | | |
|---|---|---|---|
| 4,880,104 A * | 11/1989 | Evans et al. ............... | 198/445 |
| 4,932,514 A | 6/1990 | Doppenberg | |
| 5,787,679 A | 8/1998 | Lynch et al. | |
| 6,000,526 A | 12/1999 | Van Veldhuisen et al. | |
| 6,401,936 B1 | 6/2002 | Isaacs et al. | |
| 6,609,607 B2 | 8/2003 | Woltjer et al. | |
| 6,772,872 B2 * | 8/2004 | Spangenberg et al. ....... | 198/442 |
| 6,811,017 B1 * | 11/2004 | Gross et al. ............. | 198/453 |
| 7,073,656 B2 * | 7/2006 | Gust et al. ............. | 198/453 |
| 7,128,217 B2 * | 10/2006 | Henry ..................... | 209/643 |
| 7,207,428 B2 * | 4/2007 | Huttner .................. | 198/444 |
| 7,210,568 B2 * | 5/2007 | Cull et al. ............. | 198/442 |
| 7,743,906 B2 | 6/2010 | Accettura | |
| 8,025,143 B2 | 9/2011 | Baumstimler et al. | |
| 8,168,897 B2 | 5/2012 | Suedkamp | |
| 8,490,776 B2 * | 7/2013 | Seger et al. ............. | 198/442 |
| 8,544,631 B2 * | 10/2013 | Seger et al. ............. | 198/442 |
| 2006/0021852 A1 | 2/2006 | Cull et al. | |
| 2009/0020395 A1 | 1/2009 | Accettura | |

FOREIGN PATENT DOCUMENTS

| | | |
|---|---|---|
| GB | 2 043 016 | 10/1980 |
| WO | WO 2007/117140 | 10/2007 |

OTHER PUBLICATIONS

English translation of Office Action for CN Application No. 201180024505.6, Feb. 20, 2014, State Intellectual Property Office of People's of Republic of China.

European Application No. 11 715 768.5—1707 dated Feb. 18, 2014, European Patent Office.

\* cited by examiner

APPARATUS FOR CONVEYING EGGS

The present invention relates to a system and to a method for simultaneously conveying and distributing a substantially continuous flow of products such as eggs. More particularly, a system is involved as mentioned in the preamble of claim 1.

Such a system is known from US2009020395. In this system, at a set speed of a sorting conveyor, the feed of the products, i.e. eggs, to this conveyor is readjusted. In this field of technology, for this path in the process of sorting eggs, most often, a roller conveyor is used. As is generally known, these rollers form a row of successive rollers and such a conveyor often comprises several side-by-side rows. Each pair of rollers positioned one behind the other forms a conveying position for an egg. For optimal use of such a machine, efforts are directed towards actually providing each pair with an egg, in which case a 100% degree of filling is involved. Most often, at the feed side of such a roller conveyor, an endless conveyor is utilized. Therefore, with this, the eggs will have to be fed in a very even, and especially in an evenly distributed manner, for realizing such a degree of filling. To that end, according to the invention in US2009020395, the following steps are taken:

monitoring the flow of eggs with a camera above the feed therewith controlling, on the one hand, the speed of the conveyor belt if required, when the feed is for instance too great, adding return belts for removing the surplus from the flow and later reintroducing it into the main flow.

An inevitable consequence of such a control is that conveying positions remain vacant quite regularly.

The apparatus according to the invention likewise relates to feeding and distributing eggs from a flow of eggs as evenly as possible onto a follow-up conveyor, hereinafter in this specification simply called conveyor. However, unlike in the above-described technology, the conveyor does not involve a sorting machine, but a packaging feed conveyor. This means that the supplied eggs have to be fed, distributed and arranged such that a flow of eggs is thereby obtained which is appropriate for suitably filling successively supplied packaging units. Generally known and utilized are trays or cartons with nests which during packaging are always filled completely. This also means that, as in the situation as described in US2009020395, an unordered flow, i.e. a flow coming mostly from laying houses, has to be transformed into a highly ordered flow, but more importantly that ordering cannot but result in a 100% degree of filling upon supply to and transfer to the conveyor. In this field of technology, such a conveyor is often called a 'farmpacker'.

In order to remedy the above outlined shortcoming and thereby provide for the necessity described, the system according to the invention is characterized in that on the basis of the monitoring signals and control signals, the control increases or reduces the speed of the conveyor according to a continuous adjustment.

Thus, not only a 100% degree of filling is obtained with advantage, but also it has been found, especially, that standstill of the conveyor is avoided to a large extent and more efficient processing takes place. It is precisely standstill that constitutes an interruption of the processing of the flow of often large quantities from the poultry houses.

It is noted that in the past, several solutions have been conceived to remedy this shortcoming. All these solutions cannot avoid regular stopping of, in particular, the conveyor. An example of this is described, for instance, in NL7900665.

The invention can for instance also be described as follows: a system for, in a conveying direction T during conveyance, continuously distributing a flow of products, for instance eggs, over a first conveyor, the system at least comprising:
    a feed conveyor with a substantially flat conveying surface;
    a distributing assembly with at least two feed channels extending in the conveying direction T for each forming respective product rows;
    a control for monitoring and controlling the distribution of the products over the channels mentioned,
wherein the control is configured for generating monitoring signals and control signals, the control being configured for regulating delivery of products (i.e. from the channels to the first conveyor) based on the monitoring signals and control signals, in particular such that in use, the feed channels simultaneously each transfer one product to said first conveyor,
characterized in that
the control is designed for adjusting, based on the monitoring signals and control signals, a speed of at least one conveyor according to a continuous adjustment, depending on, in particular, a product flow rate determined by the control.

The conveyor, whose speed can be adjusted under the influence of the control, can for instance comprise a conveyor of the distributing assembly, and in addition, for instance, the first conveyor mentioned (i.e. a discharge conveyor).

Further elaborations of the apparatus according to the present invention have one or more of the following features, that a monitoring system is comprised, with at least:
    a flow gauge at the upstream side of the feed conveyor for measuring at a well defined position on the feed conveyor, the flow rate of products, whereby flow rate signals are produced, and
    at least one presence detector at the downstream end of a channel whereby presence signals are produced which indicate the presence or absence of a product at the downstream end of the channel;
that the flow gauge comprises a sluice with substantially straight wall elements which are positioned just above the conveying surface of the feed conveyor and converge relative to the conveying direction T,
wherein a part of the flow of the products is caught by the wall elements, wherein the wall elements are rotatable from an initial position at minimal feed, to a passage position at larger feed, and
wherein the flow rate is determined with associated, measured wall element locations and with the speed of the feed conveyor;
that the feed conveyor comprises a first and a second sub-conveyor successive in the conveying direction,
    with the first sub-conveyor extending partly below the flow gauge, and
    with the second sub-conveyor extending substantially below the channels mentioned; and
that the distributing assembly further comprises a bottom distributing plate of fan-like configuration which is disposed just above and adjacent the conveyor surface directly downstream relative to the flow gauge, wherein the bottom distributing plate comprises channel-shaped plate recesses to each of the channels.

The present invention further comprises a method for operating the apparatus according to the present invention, wherein the method is at least comprised of
    measuring flow rate signals, and
    measuring presence signals,
wherein at least above a predetermined threshold for the flow rate signals, the speed of the at least one feed conveyor is increased or reduced at a larger flow rate or smaller flow rate, respectively, with a continuous adjustment.

The speed of only the second conveyor (for instance a second sub-conveyor of the feed conveyor) may be increased or reduced. Further, the speed of the feed conveyor may, for instance, be equal to the speed of the (discharge) conveyor.

What is obtained with great advantage is that not only the filling proceeds continuously, but also the treatment and processing of these fragile products is very gentle.

A method according to the invention can also be defined, for instance, as follows: a method for controlling the system according to the invention, wherein a flow rate of fed products is determined, and wherein preferably the presence of products in each of the channels is detected, wherein a speed of at least one conveyor is adjusted, in particular according to a continuous adjustment, when a product flow rate determined by the control exceeds a predetermined flow rate threshold value. Preferably, the speed is then adjusted directly proportionally to the measured flow rate. The speed is, for instance, not adjusted but held constant at a predetermined minimum value when the measured flow rate is below the threshold value. Preferably, a flow gauge is used, which is provided with movable wall elements, while the relative position of the wall elements is detected, which position depends on the flow rate mentioned.

Further additionally advantageous elaborations of the invention are described in the subclaims.

Figure 2:
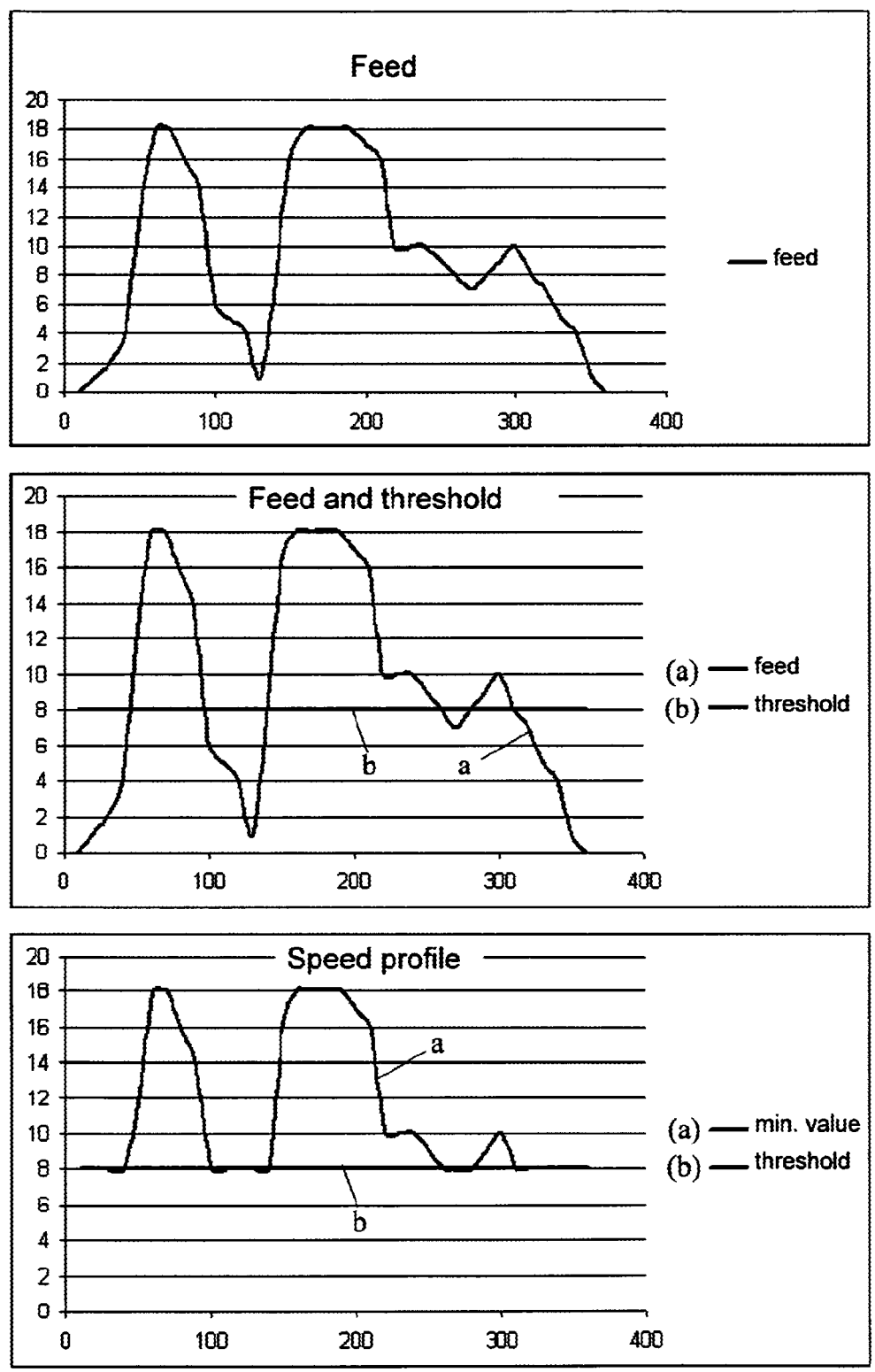

Further details and explanation will be given in the following on the basis of a drawing. In the drawing:

FIG. 1 gives a schematic top plan view of the system according to the present invention, and FIG. 2 shows a graphic example of a manner of control with a particular type of egg flow.

In FIG. 1, a diagram of the system of the invention is represented in top plan view, with the flow of eggs or conveying direction T proceeding from the bottom of the FIGURE to the top of the FIGURE. The system comprises (preceding a discharge conveyor 4):

- a feed conveyor 1 with a substantially flat conveying surface for feeding the products (in this case eggs) substantially horizontally and in mutually unordered fashion in the conveying direction T,
- a distributing assembly with at least two feed channels 30 extending in the conveying direction T, for each forming one row of products, wherein at least edge elements 31 compose edges of these channels 30 over a well-defined distribution length and wherein these edge elements 30 are for instance arranged above and adjacent an opposite conveying surface.

In use, (on the basis of monitoring signals and control signals to be discussed hereinafter) from the downstream end of the channel, products are simultaneously transferred to the discharge conveyor 4 (one product per channel, for instance at least two products at the same time, given at least two respective channels 30).

In particular, in use, the eggs (not represented) are fed in an unordered fashion by an endless belt 1, and wholly ordered on rollers are passed on with a conveyor 4 to packaging units (not represented here either). These conveying apparatuses 1, 4 represented here are driven by a drive 10 and a drive 40, respectively, well known apparatuses to those skilled in the art.

A feed conveyor 2 which has, in general, a substantially flat conveying surface, for instance in the shape of an endless flat belt, feeds the eggs along the different parts of a distributing assembly 3. The feed conveyor 2 is disposed between the upstream endless belt 1 and the downstream (discharge) conveyor 4.

In the exemplary embodiment represented here, the feed conveyor 2 comprises two sub-conveyors, a first sub-conveyor 20 with drive 200, and further downstream a second sub-conveyor 21, with a drive 210, likewise mostly endless flat belts again, with drive devices known to those skilled in the art.

The distributing assembly 3 comprises channels 30 a, b, six in the represented exemplary embodiment, and associated edge elements 31a, b, seven in this situation, for forming the six channels 30.

Such channels 30 and edge elements 31 are known, for instance from EP823208. In that publication are described not only details about the form and placement of these elements but also the manner of utilization, in particular the movement thereof. It has appeared that performing settable oscillations or reciprocating movements substantially parallel to the conveying surface eliminates congestions in the flow and hence yields a smooth, continuous flow of eggs.

An important part of the system is a control, provided with a monitoring system. More particularly, the control of the flow of eggs comprises, on the one hand, monitoring and measuring this flow and, on the other hand, controlling the flow therewith (i.e. with a detection result of this monitoring and measuring).

For such a monitoring system in the exemplary embodiment according to FIG. 1, the control is provided with a flow gauge 5, and sensors 60, 61, in particular photocells, more particularly two rows of photocells 60, 61.

More particularly, the flow gauge 5 is provided at the upstream side of the feed conveyor 2, for thereat measuring the flow rate, that is, the number of eggs passing the gauge 5 per time unit (at the location of a measuring surface). The flow gauge 5 used here comprises a sluice with two walls 50 a, b converging relative to the conveying direction T (movable away from each other, for instance rotatable) which form a passage for the eggs fed (on the feed conveyor 2). Such a sluice has a minimum passage. The sluice is configured such that eggs supplied in use can push against the walls 50a, b for pushing the walls 50a, b outwards (away from each other) (for instance against a spring force), whereby the passage is enlarged. Thus, the size of the passage depends on the amount and speed of incoming eggs. In this exemplary embodiment, the displacement of the walls 50 a, b is determined with an inductive proximity sensor. With signals thus obtained (from this sensor), when combined with the speed (of the feed conveyor) and any further data of eggs, the flow rate or a quantity related thereto can be determined.

Further downstream, rows of photocells 60, 61 monitor whether the through-flow is sufficient and remains sufficient. More particularly, both the most downstream position of each channel 30 is monitored as well as the continuity of a, continuous or non-continuous, row of eggs in such a channel 30. As follows from the drawing, in this example, two photocells 60, 61 per channel 30 are provided, for monitoring respective egg flows through this channel 30 at two different locations (at a distance from each other, viewed in the conveying direction T).

Depending on these monitoring signals (comprising signals generated by the flow gauge 5 and signals generated by the photocells 60, 61), control signals can be composed which result in the downstream end of the channel 30 being filled up with eggs as much as possible, for instance by increasing the speed of the second sub-conveyor 21 at increasing supply, while simultaneously raising the speed of the downstream conveyor 4.

In the exemplary embodiment drawn, the distributing assembly further comprises a bottom distributing plate 7 of fan-like configuration with plate recesses 71 in the form of channels. This plate 7 is also provided just above the conveying surface; the recesses 71 provide for guidance of the eggs and formation of flows directly to the entrance openings of the channels 30 a, b. Further, inclining plates 8 a, b, are represented for feeding the flow of eggs in a more directed manner downstream to the plate 7.

It will be clear to those skilled in the art that in this so-called field of technology of 'design' and of 'monitoring and control' a great many variants are conceivable, for instance
- other sensors, for instance cameras, with camera control coupled thereto;
- other presence sensors than photocells, for instance electromechanical plates as switches;
- other plates, more particularly plates with other recesses and very specifically selected angles of inclination, or also pieces of material, called islands, according to WO2007117140;
- other combinations of photocells, or even omission of the flow gauge, and also combinations where a camera is directed toward a different part of the supplied egg flow;
- dividing the feed conveyor 3 in, for instance, three sub-conveyors, and therewith simultaneously replacing the plate 7;
- measuring egg weights and the associated mass distribution for fine tuning control behaviour.

In FIG. 2, an example is given of the manner of control of an apparatus according to the present invention.

In the two upper graphs, flow rate measurements are represented as a function of time, with the flow rate measurements in arbitrary units and the time in seconds. In the bottom graph, the speed of the second sub-conveyor is shown as a function of time over the same time interval.

More particularly, in the top graph only the flow rate measurements are represented. The middle graph shows in the same curve as the top graph a horizontal line which is called threshold.

In the bottom graph, the speed is shown to be controlled in accordance with the varying flow rate, when the flow rate exceeds this threshold.

If the flow rate falls below the threshold, the speed falls back to a threshold speed.

Thus, in this example, the control is configured to compare a detected flow rate to a predetermined flow rate threshold value. The control is configured not to adjust the speed (of the sub-conveyor 21), and to keep it at a predetermined minimum speed value $v_{min}$, if the control determines that the flow rate does not exceed a predetermined flow rate threshold value.

The control is further configured to adjust the speed (of the sub-conveyor 21) if the control determines that the flow rate does exceed the flow rate threshold value. The adjustment comprises, for instance, a speed adjustment directly proportional to the flow rate, starting from the minimum speed value. In that case, the speed v(t) at time t is:

$$v(t) = v_{min} + C \cdot F(t)$$

where C is a constant, and F(t) is the flow rate at time t.

It is noted that in the example according to FIG. 2, the presence of eggs (in the channels) is each time determined by the first row of photocells 60. Any absence of eggs at the second row of photocells 61 plays no part in the present control.

Further, the speed of the downstream conveyor 4 in the control chosen here is coupled to that of the second sub-conveyor 21. In practice, this means that the speeds of the conveyors 21, 4 have a fixed ratio and are adjusted accordingly above the indicated threshold (in the above-described manner). Mostly, this ratio is unequal to 1. For instance, the speed of the flat sub-conveyor 21 will be slightly higher than that of the conveyor 4 to still maintain sufficient pressure with this flat belt.

As indicated, the flow rate is monitored in a continuous manner while stopping (of the system) can be avoided in this situation.

It will be clear to those skilled in the art that further variants and combinations are possible which are considered to fall within the protective scope of the appended claims.

The invention claimed is:

1. A system for, continuously distributing a flow of products such as eggs over a conveyor in a direction T, the system before the conveyor at least comprising:
   at least one feed conveyor with a substantially flat conveying surface for feeding the products substantially horizontally and in mutually unordered fashion in a conveying direction T,
   a distributing assembly with at least two feed channels extending in the conveying direction T, each channel forming a single row of products, wherein edge elements compose the edges of these channels over a well-defined distribution length and wherein these edge elements are arranged above and adjacent the conveying surface at the downstream end of the feed conveyor,
   a control for monitoring and controlling the distribution of the products over said channels,
   wherein, in use, monitoring signals, control signals and flow rate signals are produced, and wherein, based on said monitoring signals and control signals, at least two products are transferred simultaneously to the conveyor, from the downstream end of the at least two channels and wherein, based on the monitoring signals and the control signals, at least above a certain pre-determined threshold for flow rate signals, the control increases or decreases the speed of the said conveyor respectively, at a larger or smaller flow rate, according to a continuous adjustment.

2. A system according to claim 1, wherein the system is provided with a monitoring system comprising:
   a flow gauge at the upstream side of the feed conveyor, configured for measuring at a well-defined position on the feed conveyor the flow rate of products, and for producing said flow rate signals.

3. A system according to claim 2, wherein the monitoring system is further provided with at least one presence detector at the downstream end of a said channel, whereby presence signals are produced which indicate the presence or absence of a product at the downstream end of said channel.

4. A system according to claim 2, wherein the monitoring system is further provided with two mutually spaced apart presence detectors for each channel.

5. A system according to claim 2, wherein the flow gauge comprises a sluice with substantially straight wall elements, and in particular with a detector which detects a position of the wall elements, which position of the wall elements during use depends on the flow rate of the products.

6. A system according to claim 5, wherein the wall elements are positioned just above the conveying surface of the feed conveyor and converge relative to the conveying direction T.

7. A system according to claim 6, wherein the wall elements are rotatable from an initial position at minimum feed corresponding to a first relatively low flow rate to a passage position at larger feed corresponding to a second flow rate that is higher than said first flow rate, and the flow gauge is configured to determine said flow rate based on measured wall element positions in combination with a speed of the feed conveyor.

8. A system according to claim 1, wherein said feed conveyor comprises a first and a second sub-conveyor arranged successively in conveying direction T,
   a flow gauge at the upstream side of the feed conveyor
   wherein the first sub-conveyor extends upstream of said channels, partly under said flow gauge, and
   wherein the second sub-conveyor extends substantially under said channels.

9. A system according to claim 1, including a flow gauge at the upstream side of the feed conveyor, and wherein the distributing assembly further comprises a bottom distributing plate which is provided just above and adjacent the conveying surface, directly downstream relative to a said flow gauge, wherein the bottom distributing plate comprises channel-shaped plate recesses in each of said channels.

10. A method for continuously distributing a flow of product such as eggs over a conveyor in a conveying direction, wherein the system comprises, before the conveyor, at least one feed conveyor with a substantially flat conveying surface for feeding the products substantially horizontally and in a mutually unordered fashion in a conveying direction, a distributing assembly with at least two feed channels extending in the conveying direction, each channel forming a single row of products, wherein edge elements compose the edges of these channels over a well-defined distribution length and wherein these edge elements are arranged above and adjacent to the conveying surface at the downstream end of the conveyer, comprising the steps of:
   monitoring and controlling the distribution of products over the channels, producing monitoring signals, control signals and flow rate signals, p1 wherein, based on the monitoring signals and the control signals at least two products are transferred simultaneously to the conveyor from the downstream end of the channels, and
   wherein, at least above a predetermined threshold for the flow rate signals, the speed of at least one conveyor is increased or reduced respectively, at a larger flow rate or smaller flow rate, respectively, with a continuous adjustment.

11. A method according to claim 10, wherein the speed of only a second conveyor is increased or reduced.

12. A method according to claim 10, wherein the speed of said feed conveyor is substantially equal to the speed of the conveyor.

13. A method according to claim 10, wherein the speed of the conveyor is increased when the product flow rate exceeds a predetermined threshold value, and is held constant at a minimum value when the product flow rate is lower than said threshold value.

14. A method according to claim 10, wherein adjustment of the conveyor speed is carried out substantially on the basis of the following equation, for the case where the measured product flow rate is higher than a threshold value:

$$v(t) = v_{min} + C \cdot F(t)$$

wherein v(t) is the conveyor speed, C is a constant, $V_{min}$ is a predetermined minimum conveyor speed and F(t) is the measured product flow rate at time t.

15. A method according to claim 14, wherein the conveyor speed is not adjusted if the measured product flow rate is lower than said threshold value.

16. A method according to claim 10, including providing at least one presence detector at the downstream end of the channels, which produces at least one presence signal to indicate the present or absence of a product at the downstream end of the channel.

17. A method according to claim 16, wherein the monitoring system is provided with two mutually spaced apart presence detectors for each channel.

18. A system for, continuously distributing a flow of products, such a eggs, over a conveyor in a conveying direction T, the system before the conveyor at least comprising:
   at least one feed conveyor with a substantially flat conveying surface for feeding the products substantially horizontally and in mutually unordered fashion in a conveying direction T,
   a distributing assembly with at least two feed channels extending in the conveying direction T, each channel forming a single row of products, wherein edge elements compose the edges of these channels over a well-defined distribution length and wherein these edge elements are arranged above and adjacent the conveying surface at the downstream end of the feed conveyor,
   a control for monitoring and controlling the distribution of the products over said channels,
   wherein, in use, monitoring signals and control signals are produced, and wherein, based on said monitoring signals and control signals, from the downstream end of the at least two channels at least two products are transferred simultaneously to the conveyor,
   wherein, based on the monitoring signals and the control signals, the control adjusts the speed of the said conveyor according to a continuous adjustment,
   including a monitoring system having a flow gauge at the upstream side of the feed conveyor, configured for measuring at a well-defined position of the feed conveyor the flow rate of products and for producing flow rate signals,
   wherein the flow gauge comprises a sluice with substantially straight wall elements, and in particular, with a detector which detects a position of the wall elements, which position of the wall elements during use depends on the flow rate of the products, and
   wherein the wall elements are positioned just above the conveying surface of the feed conveyer and converge relative to the conveying direction T.

19. A system according to claim 18, wherein the wall elements are rotatable from an initial position at minimum feed corresponding to a first relatively low flow rate to a passage position at larger feed corresponding to a second flow rate that is higher than said first flow rate, and the flow gauge is configured to determine said flow rate based on measured wall element positions in combination with a speed of the feed conveyor.

* * * * *